United States Patent [19]

Knote

[11] Patent Number: 4,625,452

[45] Date of Patent: * Dec. 2, 1986

[54] BAIT STATION AND TRAP

[76] Inventor: Charles E. Knote, 2323 Brookwood Dr., Cape Girardeau, Mo. 63701

[ * ] Notice: The portion of the term of this patent subsequent to Jun. 11, 2002 has been disclaimed.

[21] Appl. No.: 719,380

[22] Filed: Apr. 3, 1985

Related U.S. Application Data

[63] Continuation-in-part of Ser. No. 540,407, Oct. 11, 1983, Pat. No. 4,521,987.

[51] Int. Cl.⁴ .............................................. A01M 1/20
[52] U.S. Cl. .......................................................... 43/131
[58] Field of Search .......................................... 43/131

[56] References Cited

U.S. PATENT DOCUMENTS

| | | | |
|---|---|---|---|
| 882,142 | 3/1908 | Craun | 43/131 |
| 1,086,610 | 2/1914 | Nunes | 43/131 |
| 1,325,069 | 12/1919 | Young | 43/131 |
| 2,532,681 | 12/1950 | Stover | 43/131 |
| 2,714,780 | 8/1955 | Glover | 43/131 |
| 2,896,362 | 7/1959 | Wingate | 43/131 |
| 4,228,613 | 10/1980 | Kalnasy | 43/131 |
| 4,349,982 | 8/1982 | Sherman | 43/131 |

FOREIGN PATENT DOCUMENTS 541844 10/1985 United Kingdom ................. 43/131

Primary Examiner—Nicholas P. Godici
Assistant Examiner—Christopher L. McKee
Attorney, Agent, or Firm—Paul M. Denk

[57] ABSTRACT

A tamper resistant bait station for holding a supply of rodent or other pest bait is disclosed having an outer housing and a tray slidably received within the housing, and is secured in its received position by a tamper-resistant closure. The floor of the housing and the floor of the tray are elevated above the ground and have entrance openings therein in register with one another when the tray is inserted in the housing so that a pest, such as a mouse or rat, may enter the housing and the tray from below via the entrance openings. Partitions within the tray define the various passages and compartments within the tray, these partitions having notches or other openings therethrough to permit the pest to travel from the entrance openings to the bait compartment and to exit the bait station, but yet preventing tampering with the rodent bait and preventing protected wildlife from entering the bait station. The station may be secured to a wall or the like.

6 Claims, 15 Drawing Figures

BAIT STATION AND TRAP

CROSS-REFERENCE TO RELATED APPLICATION

This application is related to and it comprises a continuation-in-part of the U.S. patent application of Charles E. Knote, Ser. No. 540,407, filed on Oct. 11, 1983, now U.S. Pat. No. 4,521,987.

BACKGROUND OF THE INVENTION

This invention relates generally to a tamper resistant bait station for holding a supply of toxic pest bait, such as a rodenticide pellet or powder (or other poisonous substance), to be ingested or externally contacted by undesired pests (e.g., mice, rats, snails, or slugs).

For a number of years, it has been conventional, particularly in large commercial buildings, food warehouses, restaurants, farm buildings, schools, and even in human residences, to use a poisonous bait or poisonous tracking powder to poison undesired pests. Even more particularly, in the control of mice and rats, zinc phosphide, and anti-coagulant rodenticides have been widely used. Generally, all such rodenticide baits and bait concentrates approved for use by the United States Environmental Protection Agency require labeling to the effect that baits must be placed in tamper proof bait boxes or in locations not accessible to children, pets, domestic animals, or protected wildlife. Further, warnings are given not to place the bait in areas where there is a possibility of contaminating food for human consumption or of contaminating surfaces that come in contact with food. Also, it is highly desirable that powdered baits not be positioned so that it may be disturbed by air currents and thus drawn into ventilation ducts or blown onto food or food contact surfaces.

Prior to and during World War II in England, considerable research was done in regard to bait containers for field use. In 1954, a publication entitled *Control of Rats and Mice*, pp. 147-159, published by Oxford University Press, London, described two types of bait containers, the first being a specially shaped box in which the bait is inaccessible to animals other than rodents and the other being a blocked drain pipe. The bait box described in the above-identified publication was also disclosed in British Pat. No. 541,844. Generally, this bait box had an enclosed chamber in which the bait was placed with an access opening being provided in the bottom floor defining the chamber so that the rodents may enter the bait box from below. However, it had been noted by the inventors of the above-identified British patent specification that wildlife, such as field sparrows, could enter this prior bait box and gain access to the poisoned bait. Also, because of the design of this prior bait box, it would be possible for a child to reach his hand into the access opening of the bait box and also have direct access to the bait.

Reference may also be made to such U.S. Pat. Nos. 794,323, 1,086,610, 1,309,606, 2,299,723, 3,045,387, 3,965,609, 4,208,829, 4,228,613, 4,251,946, which disclose various permanent bait stations for holding a supply of toxic rodent bait or the like. Generally speaking, these prior bait stations have tamper proof access openings or closures, but each of these prior bait stations has certain drawbacks, particularly when considered in light of the more recent United States Government Environmental Protection Agency regulations dealing with rodenticide baits.

Still further, such U.S. Pat Nos. 3,298,128, and 4,031,653 disclose various foldable bait stations of fibreboard material, plastic or the like. However, as is intended for these fibreboard bait stations, they do not offer the security required for a permanent bait station and these fiberboard bait stations are intended to be disposed of regularly.

U.S. Pat. No. 4,062,142 discloses a trapping and killing apparatus for mice which traps a live mouse therewithin and which automatically dispenses a quantity of poisonous gas so as to kill any mouse trapped therein.

U.S. Pat. No. 4,251,946 discloses a snail and slug trap wherein the bait is a pesticide which is activated by water contained within a water reservoir.

Lastly, U.S. Pat. No. 4,281,471 discloses a rodent tunnel in the form of an elongate tube so that mice will run through the tube. Cartridges of a suitable contact rodenticide are placed at intervals along the tube such that the mice come into contact with the rodenticide as they travel through the tube and become fatally affected by it.

SUMMARY OF THE INVENTION

Among the several objects and features of the present invention may be noted the provision of a bait station for a powdered rodenticide or the like which may be securely locked in its operative position by means of a low-cost, tamper resistant locking or closure device and yet which may be readily opened for servicing and replenishment of the bait and for removal of dead pests;

The provision of such a bait station which may be readily fastened to a wall or the like of a building in position so as to attract mice, rats, or other pests which are desired to be exterminated;

The provision of such a bait station which accommodates the normal feeding instincts mice and rats thus encouraging them to consume a large portion of their daily diet from the bait station, this being particularly important in the effective treatment of rodents with a multi-dosage and so-called single-dose, anti-coagulant baits;

The provision of such a bait station in which desirably protective wildlife, even field sparrows, are effectively denied access to the bait within the bait station;

The provision of such a bait station which effectively stops movement of air through the bait station which may carry airborne toxic bait or dust out of the bait station;

The provision of such a bait station, when installed in the out-of-doors, effectively shields the bait therewithin from moisture;

The provision of such a bait station which is of such a design so as to positively prevent the fingers of either an adult or child from physically coming in contact with the bait within the main bait compartment of the bait station so long as the bait station is in its installed position;

The provision of such a bait station which is constructed as to provide a familiar surface, such as bare ground, rock, asphalt, or concrete, as the beginning of a darkened entrance tunnel leading to a multi-plane maze in the darkened interior thereby to encourage rodents and to give them the security to enter and remain in the bait station and to feed on the bait;

The provision of such a bait station which is so constructed as to provide a darkened entrance tunnel, and darkened interior thereof, thereby to encourage rodents and to give them the security to enter and remain in the bait station and to feed on the bait;

The provision of a bait station wherein various side top walls may be openable, or removed, so as to facilitate access into the station for either its loading with bait, or for removal of any terminated rodents;

The provision of such a bait station which is of low cost, which is of rugged construction, which has a long service life, and which is in compliance with existing U.S. Government Environmental Protection Agency regulations relating to toxic rodenticides and the like.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
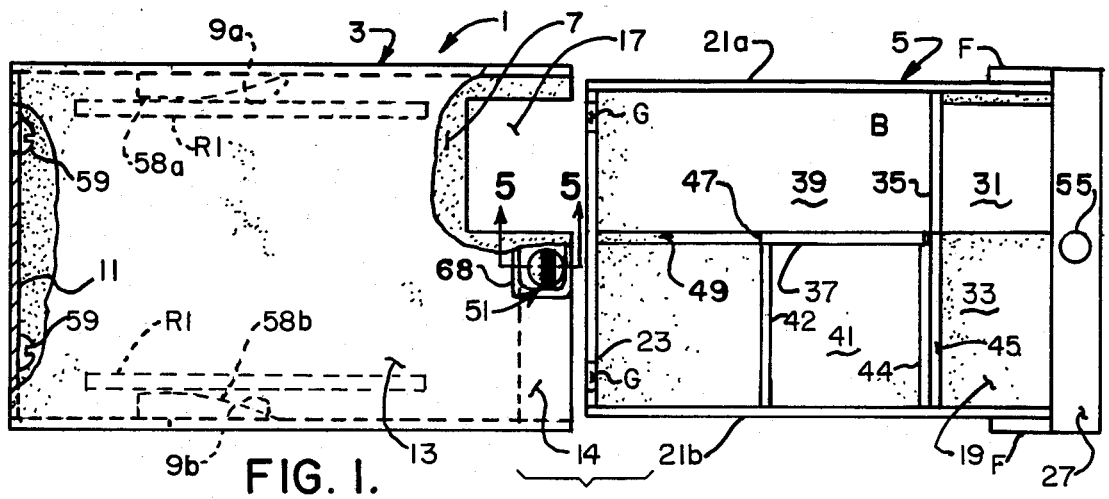
FIG. 1 is a top plan view of the bait station of the present invention illustrating a housing and a compartmentized tray which slides horizontally into the housing between a disassembled position (as shown in FIG. 1) and an installed position (not shown) in which the tray is received in the housing, with portions of the housing broken away to illustrate details of construction.

Referring now to the drawings, a bait station, as generally indicated by reference character 1, is shown to comprise a housing 3 and a tray 5 with the tray being slidable in horizontal direction between a removed position (as shown in FIG. 1) in which the tray is clear of the housing and an installed position (not shown) in which the tray is received within the housing.

Referring now to housing 3, it includes a support or floor 7 having a pair of opposed housing sidewalls 9a, 9b extending upwardly from the floor at the opposite sides thereof. A back housing wall 11 extends up from the floor 7 between sidewalls 9a, 9b, and a top 13 bears against the upper edges of the side and back walls and is secured or bonded thereto so as to form a substantially rectangular, sealed opening or cavity therewithin having an open front for receiving tray 5. Housing top 13 has an overhang 14 which extends out beyond the front edge of floor 7. As shown best in FIGS. 2 and 3 and as indicated at 15a, 15b, sidewalls 9a, 9b extend down below the level of housing floor 7 for supporting houng 3 on the floor F of a building or the like. Still further, in accordance with this invention, the housing floor 7 has an access opening 17 therein, this access opening being shown to be located adjacent the front edge of the floor and offset to one side of the housing, as best illustrated in FIG. 1. However, it will be understood, that within the broader aspects of this invention, opening 17 may be located at any desired location on floor 7.

Figure 2:
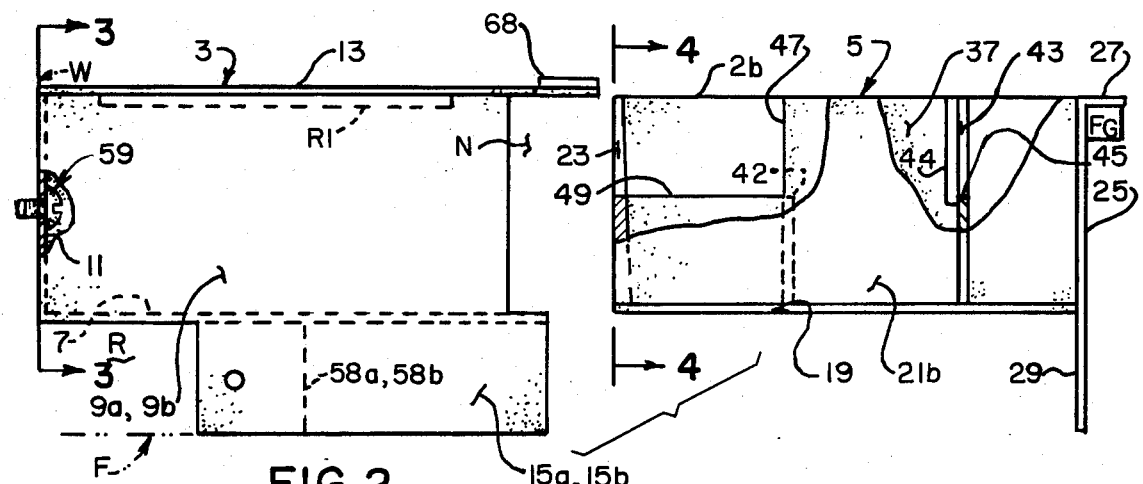
FIG. 2 is a side elevational view of FIG. 1, again with portions of the housing and the tray broken away to illustrate details of construction with the back wall of the housing installed against the wall of a building (shown in phantom) and with the housing resting on the floor of the building (also shown in phantom)
Figure 3:
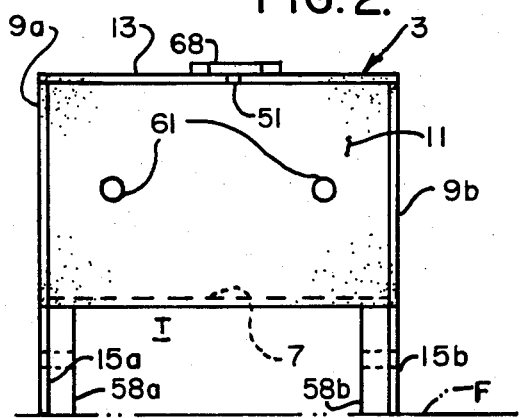
FIG. 3 is an end elevational view of the housing taken along line 3—3 of FIG. 2.
Figure 5:
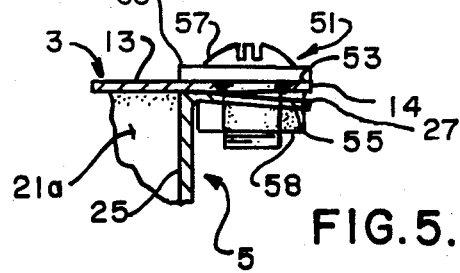
FIG. 5 is a vertical cross-sectional view taken along line 5—5 of FIG. 1 on an enlarged scale illustrating a tamper-resistant fastener utilized to secure the tray within its installed position within the housing.

Tray 5 is shown to comprise an open top, boxlike structure having a tray floor 19 with opposite tray sides 21a, 21b and a tray end or backwall 23 sealingly secured to and extending up from the tray floor. The back wall 23 is preferably sloped at an angle of about 5° (as shown in FIG. 2) to compensate for the wall securing device in the housing. The width of the tray floor and the height of the side and endwalls of the tray is such that the tray 5 is readily received within the open front of housing 3 so that it may be readily slid into and out of the housing. Still further, tray 5 has a front end wall 25 at the end thereof opposite the backwall and this front tray wall has a tray ledge 27 extending horizontally, outwardly from the upper edge of the tray front wall such that with the tray received within the housing, the tray ledge 27 is disposed below in close proximity to the housing top overhang 14, as best shown in FIG. 5. The front of tray ledge 27 may slope downwardly to direct moisture away from the interior of the bait station. Further, tray front wall 25 has an extension or leg, as indicated at 29, which extends down below tray floor 19 and which, together with housing side extensions 15a, 15b, constitute the legs or supports for the bait station when the tray is inserted into the housing in its installed position. At each side of housing 3, notches N are provided. Tray 5 has side flanges F which are received in notches N and aid in enabling one to grip the tray for removal from the housing. Further, a finger grip FG may be provided on tray front wall 25 to permit removal of the tray. The inner face of housing top 13 has a pair of spaced rails R1 extending lengthwise therewithin. Grooves G are provided in the upper edge of tray back wall 23 to cooperate with rails R1 and to aid in guiding of the tray as it is slid in and out of the housing. Also, these cooperating rails R1 and grooves G inhibit moisture from entering the bait station and prevent dust from bait B from escaping.

Still further, tray floor 19 is provided with a tray access opening 31 (see FIG. 1) generally in register with housing cess opening 17 when the tray is inserted into the housing in its installed position. In this manner, a pest, such as a mouse or the like, on building floor F may readily enter the housing and the tray from a tunnel T below housing floor 7 via housing access opening 17 and via tray access opening 31 from below. The pest or mouse enters the tray through access opening 31, and moves into a so-called entry passage 33 defined by a first partition 35, portions of tray sidewalls 21a, 21b, and by tray front wall 25. The remainder of the interior of tray 5 is further divided by a second partition 37 into a bait compartment 39 and into a so-called intermediate compartment 41. As indicated at B, a suitable bait, such as a rodenticide or the like, which is attractive to the pest, is placed within bait compartment 39. The intermediate compartment 41 is divided by a low partition 42 which aids in preventing the loose bait B from being kicked out of the tray by the pests and which also prevents the pests from catching particles of bait.

Figure 4:
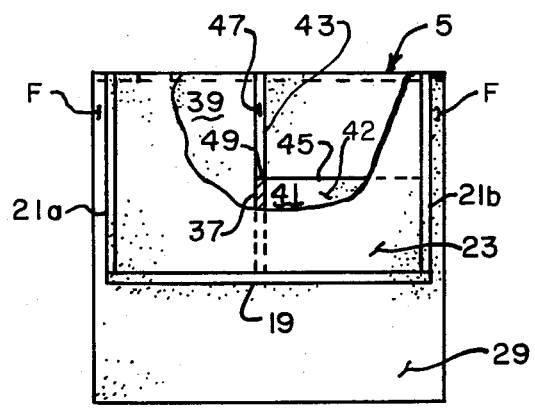
FIG. 4 is an end elevational view of the tray taken along line 4—4 of FIG. 2.

With the pest (e.g., a mouse) having entered entry passage 33 via the access openings 17 and 31, the pest will smell or sense the bait and be attracted thereto. To permit passage of the pest from entry passage 33 into the bait compartment 39, a first opening or notch 43 is provided in partition 35 thereby to permit the pest to travel from entry passage 33 into the intermediate chamber 41. As best shown in FIG. 4, this first opening 43 is defined by a first threshold 45 provided in partition 35 which is spaced somewhat above the level of tray floor 19, but yet which provides a sufficient space between the upper surface of threshold 45 and the inner surface of housing top 13 so as to permit the mouse (or other pest) to travel up over the threshold 45 and into intermediate chamber 41. Optionally, a hinged door 44 may be provided on the inside of intermediate compartment 41 adjacent opening 43 to still further aid in containing the loose bait. Door 44 is hinged at its top and is normally closed, but the door is readily opened by a pest entering chamber 41 from entrance 33. It will be understood that door 44 may extend below threshold 45 so that the door 44 may not be opened by a pest within chamber 41. Thus, the bait station 1 may also serve as a trap.

Likewise, a second opening or notch 47 is provided in the second partition 37 to permit the mouse within chamber 41 to pass back and forth from the intermediate chamber into the bait compartment 39. This second notch 47 is defined by second threshold 49 in partiion 37 and, like threshold 45, threshold 49 is spaced above the level of tray floor 19, but yet is spaced below housing top 13 a sufficient distance so as to permit the mouse to have ready access to the bait compartment.

While it will be understood that the dimensions of bait station 1 of the present invention may be varied considerably, depending on the particular type of pest (e.g., a mouse, a rat, snails, slugs, or the like) to be baited, the dimensions of the housing, the tray, and the access openings 17 and 31 in the housing and the tray should be sized so that the desired pests may readily enter the bait station, may readily travel from one compartment to another via the openings 43 and 47 and yet will effectively prevent certain kinds of protected wildlife and children or adults from entering the bait station via the access openings and gaining access to the bait B in bait compartment 39.

For example, if bait station 1 is intended to serve as a bait station for house mice or the like, housing 1 may have a width of approximately 3.4 inches (8.6 cm.) and a length along its side (not including top overhang 14) of approximately 4.75 inches (12.0 cm.). As mentioned, tray 5 is dimensioned so as to readily slide into and out of the interior of housing 3 and may, for example, have a height of 2.0 inches (5.1 cm.). Further, side housing wall extensions 15a, 15b and front tray wall extension 29 constituting the legs of the bait station, may have a length extending below floor 7 of housing 13 of approximately 1 inch (2.54 cm.) so as to form tunnel T beneath the lower surface of housing bottom wall or floor 7. Housing wall extensions 15a, 15b may have tapered blocks 58a, 58b on the inside faces thereof so as to reinforce the wall extensions and to provide a smaller cross section into tunnel T so that the darkened tunnel will not be attractive to other forms of wildlife. Additionally, the dimensions of access openings 17 and 31 in housing floor 7 and tray floor 19, respectively, are approximately 1.5 inches (3.8 cm.) by 1.0 inches (2.54 cm.) so as to permit a mouse to readily enter the bait station from below. These dimensions are such as to permit a mouse to readily enter the bait station via the access openings but yet, in a manner as will be more specifically pointed out hereinafter, effectively prevent other larger animals, such as field sparrows, dogs, and the like from having access to the bait within the bait station. Moreover, it has been determined that the above-mentioned size for the access openings 17 and 31 will permit a variety of smaller pests, such as house mice, white-footed deer mice, large cockroaches, garden slugs and snails to enter the bait station. This size opening was selected taking the size and habits of a full-grown house mouse into account. It will be appreciated that the eyesight of a mouse is not good and that a mouse finds its food primarily through its sense of smell. A mouse is accustomed to moving freely in darkened, cramped quarters and depends on sensory hairs along its back, ears, face, and sides plus it vibrissae (or whiskers) to guide the animal safely. The above-mentioned size of the access openings 17 and 31 and the size of bait station 1 is such that a typical mouse will freely enter the bait station and will be guided through the openings in the various baffles to bait B in bait station 39. It has been found that if the dimensions of the bait station are appreciably smaller than above indicated, mice will have a tendency not to enter the bait station because of undue contact with the access opening and the sides of the compartment with the mouses's vibrissae. However, the size of the access openings has been kept to a minimum so that other wildlife and domestic pets will not have ready access to bait B within the bait station.

Further in accordance with this invention, bait station 1 is intended to be substantially tamper resistant so as to prevent small children or the like from removing tray 5 from within housing 3 so as to have access to the bait B within bait chamber 39. This tamper resistant feature may be accommodated in any number of manners including the provision of a key and lock mechanism (not shown) so as to securely fasten the tray within the housing. However, because of the expense of a key and lock system, effective tamper resistance may be provided by securing the tray within the housing by means of a selectively actuable locking fastener means, as generally indicated at 51, as best illustrated in FIG. 5. More specifically, an aperture 53 is provided in top overhang 14 of housing top 13 and this last mentioned aperture is in register with another aperture 55 provided in tray ledge 27 when the tray is fully received in its installed position within the housing. A locking fastener 57 may be inserted through the apertures 53 and 55 and threadably extends into a housing 58 which hides fastener 57. It will be appreciated that any number of conventional tamper resistant fasteners may be utilized to prevent unauthorized entry into the bait station. For example, fastener 57 may be a special screw having a special spanner head which does not have a conventional drive slot. A modified screwdriver must then be utilized as the drive tool so as to install and remove the fastener from housing 58. Additionally, a variety of proprietary fastener heads are available from different manufacturers which also require specialized drive tools for installation and removal.

As best in FIG. 2, housing 3 is primarily intended to be mounted within a building along a wall W of the building with the back face 11 of the housing in flush engagement with the wall and with the bottom ends of side extensions 15a, 15b and the bottom of tray front wall extension bearing on building floor F. More specifically, fastener means, as indicated at 59, may be inserted through slots 61 for threadably securing the bait station housing to wall W of the building. As shown in FIG. 2, fastener means 59 may be constituted by a conventional wood screw or the like. It will be appreciated that with the dimensions of housing 3 as generally outlined above, it is a relatively easy matter to install screws 59 in holes 61 in the back wall 11 of the housing and to securely mount the housing to wall W. Those skilled in the art will appreciate that the housing may be secured to the floor or wall by any suitable fastening means, such as bolts, clamps or adhesive tapes. For example, back wall 23 may be adhered to a board (not shown) which in turn may be secured to a building wall.

It will further be appreciated that with the back wall of the housing mounted to wall W and with the bottoms of housing side extensions 15a and 15b and with the bottom of front tray wall extension 29 bearing on the floor F, the bottom wall 7 of housing 3 is raised above the floor F approximately 1 inch and thus a runway, as indicated at R in FIG. 2, is formed by wall W, the floor F, and the notched portions in the housing side wall extensions 15a, 15b. It is conventional for pests, such as mice, to travel in close proximity to the intersection of the wall W and the floor F of the building and thus mice would have a strong tendency to travel through runway R of bait station 1. As the mice travel through the runway R, they come in close proximity to bait B which is relatively easy for them to smell. Then, the tunnel T defined by the sidewall extensions 15a, 15b and by the front wall extension 29 provide a ready path which the mouse is likely to explore. The fact that tunnel T is the same level as floor F and is a part of the floor having the same feel as the floor gives the mouse confidence to enter the tunnel. It is a natural tendency for a mouse or other rodent, when in a cramped, dark enclosure, such as tunnel T, to feel upwardly as well as to the sides ad thus the mouse is quite likely to find the upward access openings 17 and 31. Then, drawn by the odor of bait B in bait compartment 39, the mouse will enter compartments 33 and 41, and finally bait compartment 39. Because of the dark secure nature of the bait station, the mouse will have a tendency to feel secure within the bait station and thus is likely to feed on bait B for a considerable length of time. The multi-plane surfaces of the ground in tunnel T, of floor 19, and of the various partitions 35, 37, and 43 form a maze leading to bait compartment 39 which is conducive to rodents remaining in the bait station. Moreover, because the bait stations are at least semi-permanent fixtures installed within the building and may be present for a length of time, the mouse will likely return to the bait station for subsequent feedings of the bait when repeated dosages of the bait are required to be effective.

It will also be appreciated that with the bait station 1 of the present invention secured to wall W by screw 63 as above described, the bait station of the present invention is rendered even more tamper resistant to small children or the like. More specifically, with the tray 5 securely fastened within the housing 3 by means of tamper resistant fastener means 51, as heretofore described, a child must attempt to reach his finger into tunnel T from below via the runway R. Further, it would be necessary for the child to reach his finger up through access openings 17 and 31, through the entrance passageway 33, through the first access notch 43 in the first partition 35, through the intermediate compartment 41, through the second notch 47 and into the bait compartment 39. Also, because of the circuitous path that small animals must traverse to the bait compartment 39, only nocturnal, inquisitive rodents generally of the size of the desired pest (e.g., a house mouse or the like) would be likely to enter the bait station. Thus, even if the bait station were proportionately scaled up in size so as to be effective against rats, domestic cats and the like would be unlikely to enter runway R, tunnel T and follow the above-described path through the bait station to the bait B.

It will also be appreciated that when the bait stations 1 of the present invention are installed in a large commercial building, such as a food warehouse, barn or the like, it is necessary to periodically clean the bait stations and to replenish the supply of bait B. This may be readily done by utilizing a special tool so as to remove tamper resistant fastener means 51 thereby to permit tray 5 to be withdrawn from housing 3. The debris within the tray including the old supply of bait B may then safely be disposed of by dumping the tray into a suitable container and the supply of bait B may be replenished within the bait chamber 39. The tray may then be reinserted into the housing and the tamper resistant fastening means may then be reinserted in apertures 53 and 55. Thus, the periodic servicing of the bait stations may be accomplished within a matter of less than a minute or so, this being extremely important realizing that there may be several dozen of the bait stations strategically located throughout a large warehouse or barn.

It will also be appreciated that because of top overhang 14 and because of the tray front wall extension 29, and further because of the sealed joints between all of the walls of the housing and e tray, and further, because of the bottom access opening 17 and 31, the bait within the bait station is adequately protected from the rain and the wind thus serving to prevent the bait from degrading due to exposure to the elements and also effectively preventing dried baits or powders from being blown by the wind and scattered throughout the warehouse, possibly coming in contact with food or being drawn into ventilating ducts or the like.

While one particular design of the bait station of this invention has been disclosed wherein the housing and the tray are generally of rectangular shape, it will be appreciated that other configurations or shapes of the bait station 1 of the present invention could be readily used while employing the same inventive features of the present invention utilizing bottom access openings, runways R, tunnels T, entrance passageways 33, intermediate passages 41, a bait compartment 39 with baffles formed by thresholds 45 and 47 through the partition leading from one compartment to another. More specifically, it will be understood that the number of partitions within the tray 5 may be varied and the location of the openings may be changed and yet the bait station may still be within the broad inventive concept of the present invention.

Figure 6:
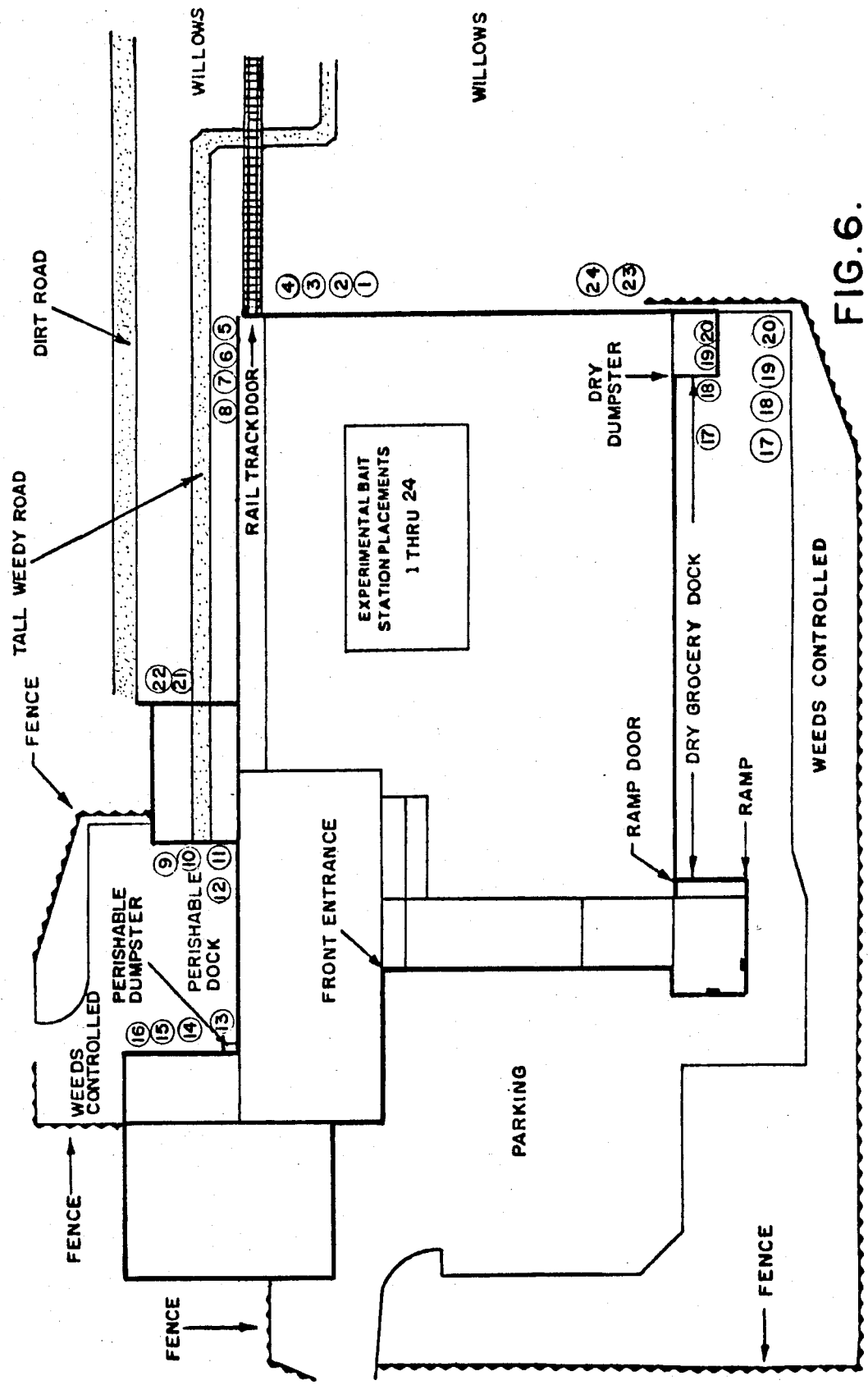
FIG. 6 is plan view of a large food warehouse showing the locations of twenty-four bait stations of the present invention in a side-by-side comparison with prior bait stations.

In order for the bait station 1 of the present invention to be effective in eradicating mice, rats, or other pests, it is important that the pests utilize the bait station for a major portion of the food consumed by the pests, particularly where multi-dosage, anti-coagulant rodenticides are utilized. To compare the effectiveness of the bait station 1 of the present invention with a standard so-called Eaton or NBS mouse station, this Eaton mouse station beingdescribed in National Bureau of Standards publications, some twenty-four bait stations 1 of the present invention were installed on the exterior of a large food warehouse in side-by-side relation with the prior art NBS stations with the stations spaced 3 inches apart and with each of the bait stations being charged with equal, predetermined amounts of the identical bait. The NBS station is a box with side entry, a partial divider therein, and for separating the entry chamber from the bait holding chamber. In FIG. 6, the locations of these dual bait station locations are shown by the circled numbers. Then, over a period of time, the bait stations were periodically checked and the amount of bait consumed from both the bait station 1 of the present invention and the prior art standard bait station at the same location were compared.

Figure 7:
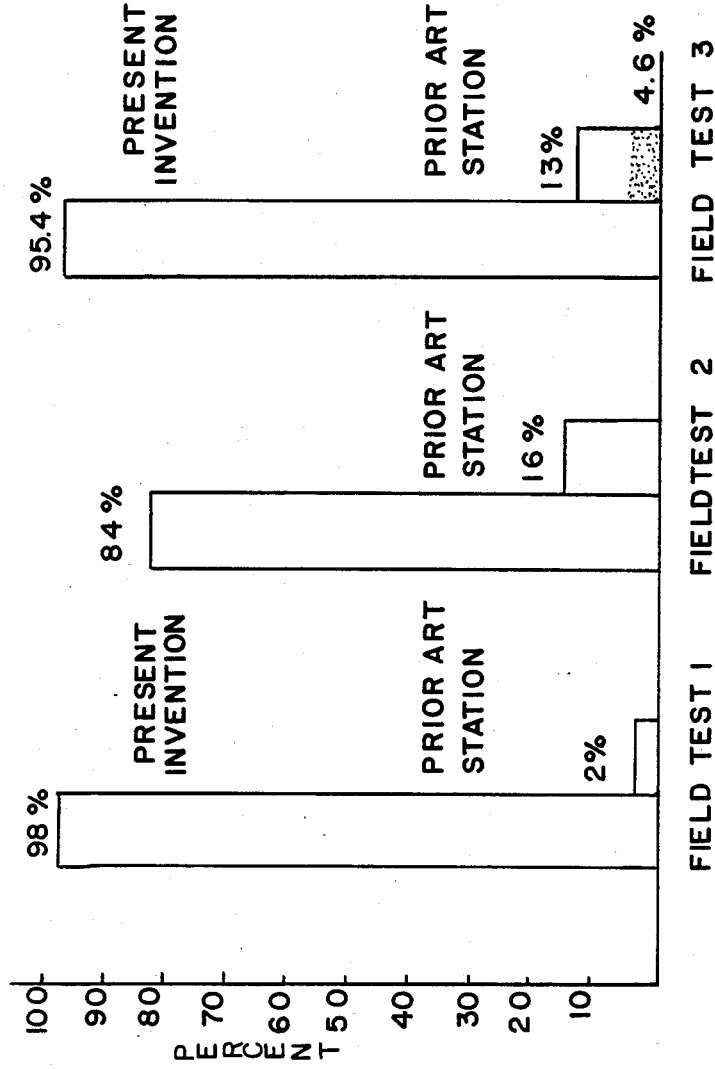
FIG. 7 is a graph comparing the effectiveness of the bait station of the present invention with prior bait stations in three different field tests.

In conducting the field tests, it will be appreciated that a number of test stations are required to take into account the fact that at certain locations, mouse feeding may be particularly heavy while at other stations, mice may not frequent the bait stations during the test period. Also, it will be appreciated that at some locations, considerably more food may be consumed in one bait station than the other (i.e., more food consumed in the prior art bait station than in the bait station 1 of the present invention or vice versa). However, on the average, considerably more bait was consumed in the bait stations 1 of the present invention than in the adjacent prior art bait station. This increased consumption is shown graphically in FIG. 7 by presenting the comparative feeding test results of 3 field experiments in which bait station 1 of the present invention were installed in side-by-side relation wih the above-described prior art NBS bait stations. In the first field test, approximately 98% of the bait consumed during the field test was consumed within bait stations 1 of the present invention while only 2% of the bait consumed was in the prior art bait stations. In the second and third field tests, the amount of bait consumed in the bait stations 1 of the present invention was approximately 84% and 87%, respectively. Thus, it is readily seen that the effectiveness of the bait stations 1 of the present invention is several times greater than the prior art bait stations in inducing the pests to eat the bait on a consistent, repeated basis.

While housing 3 was described as having a continuous tray support floor 7 with access opening 17 therein, it will be understood that the tray support may consist of ledges or shoulders (not shown) secured to each wall 9a, 9b of the housing so that tray 5 will be supported thereon. Other tray support structures are within the broader aspects of this invention.

Figure 11:
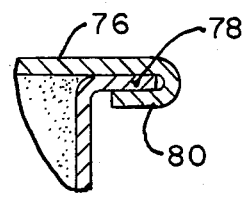
FIG. 11 is a sectional view disclosing the interlocking feature between the removable lid and the lip of an upper side wall of the said station.
Figure 9:
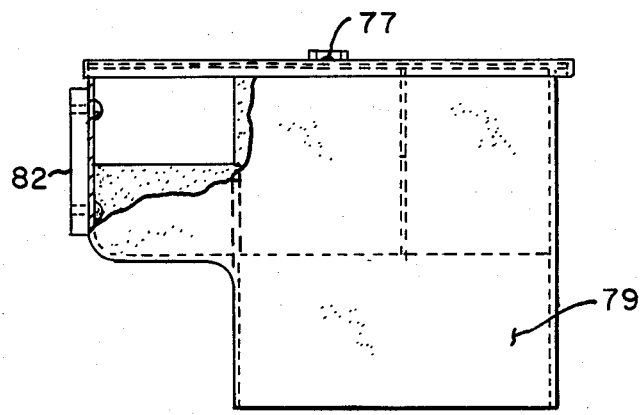
FIG. 9 is a left side view of the bait station disclosed in FIG. 8.
Figure 12:
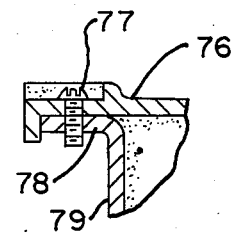
FIG. 12 is a sectional view of the lid fastening means taken along the line 12—12 of FIG. 8.
Figure 10:
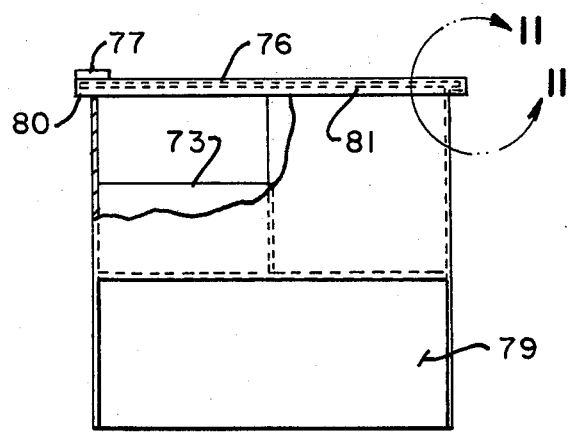
FIG. 10 is a front view of the bait station disclosed in FIG. 8.

Heretofore the bait station of this particular invention has been defined as incorporating a housing having a cooperating trap that inserts therein, and into which the rodent enters and passes for attaining access to the positioned bait. But, it is just as likely that the concept of this invention can be embodied within a single structural entity, and if referring to FIG. 8, it can be seen that another form of housing 70 may be provided, and which integrates together the previous structures and advantages obtained therefrom for the tray and housing components as previously defined with respect to FIGS. 1 through 5. In this particular embodiment, the housing 70 does incorporate the usual access entrance 71, so that the rodent may then pass into the passageway 72, over the partition 73, and over, perhaps, a second partition 74, and pass over, once again another shallow partition 75, to attain access to the positioned bait B. Obviously, these various partitions may be located at other positions within the structure of the housing, and yet function to achieve the same results desired for the operations of the particular bait station of this invention. In any event, in this particular embodiment, the unique feature of it is that the lid or top wall 76 of the housing is removable. A fastener 77, such as a common screw, as shown in FIG. 12, secures the lid 76 to the integral flange 78 that extends around most of the perimeter of the housing sidewalls 79. Thus, by a simple removal of the screw 77, the lid 76 can be slid from its interconnection by means of the turned outer edges of the said lid, as can be seen at 80, and which normally overlaps the said flanges 78 of the said sidewalls 79. It can be seen that the back edge 81 of the lid 76 does not have the interengageing relationship as shown for the remaining edges of the lid, as disclosed in FIG. 11. Thus, the lid simply can be slid forwardly, to attain its removal, and thereby allow access into the various chambers of the disclosed trap.

As can also be seen, securement means in the form of mounts 82, provides means for securement of the trap to the wall, such as either through the application of pressure sensitive adhesive, or perhaps through simply adhering by means of fasteners or screws of the mounts to the adjacent wall against which the bait station and trap is located.

Figure 8:
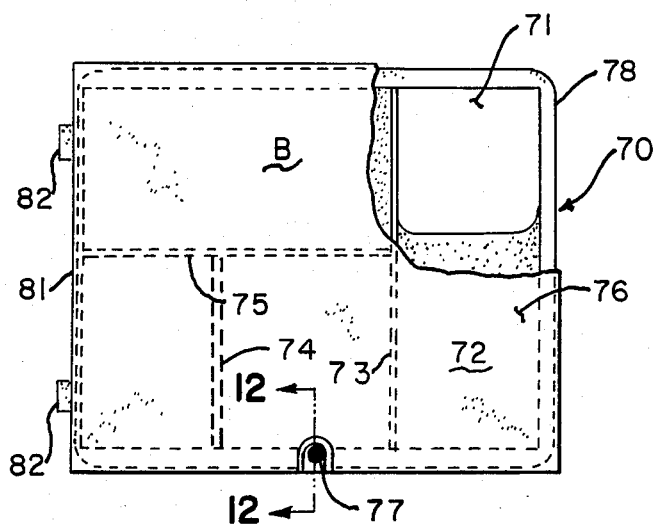
FIG. 8 is plan view of the bait station, with a portion of its lid being removed so as to disclose the access opening into the interior of the said station, and further disclosing a fastening means for securement of the removable lid in place.
Figure 13:
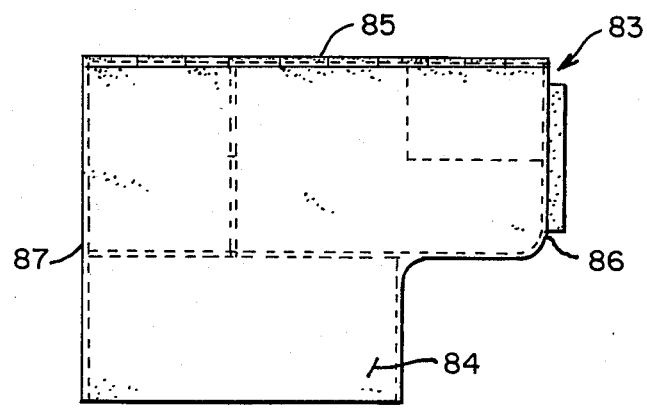
FIG. 13 is a side view of a modified form of bait station.
Figure 14:
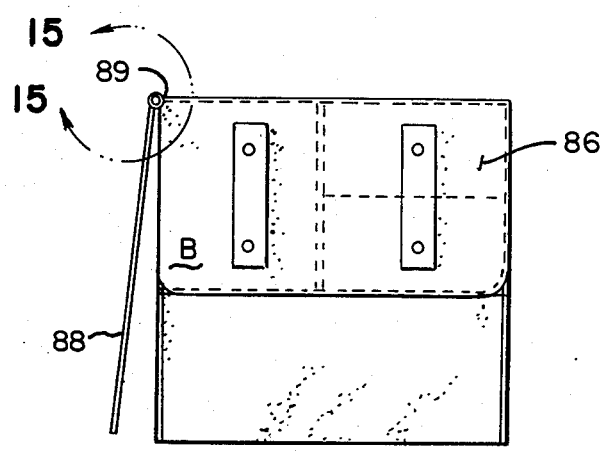
FIG. 14 is a back view of a bait station, disclosing how one side is openable to attain access into said station.
Figure 15:
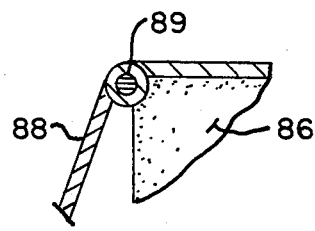
FIG. 15 discloses the hinge means for the side wall taken along the line 15—15 of FIG. 14.

Another modification upon the style of trap as previously shown and explained in FIG. 8 is disclosed in FIGS. 13 through 15. In this particular embodiment, the bait station 83 includes the usual sidewalls 84, top wall 85, back wall 86, and a front wall 87. In this particular embodiment, though, one of the side walls, namely, 88, is hingedly connected, by means of the hinge 89, to the structure of the housing, and therefore, the wall may be pivoted into an open position, in order to attain access into the interior of the bait station. In this particular instance, it is preferred that the entrance into the station be into that region where the bait B normally locates, so that if any terminated rodents may be located therein, they can be easily removed, and the bait replenished. Any form of fastening means (not shown), such as a screw, or the like, can be used for securement of the openable wall 88 to the housing structure. Obviously, the top wall or front or back wall could be hingedly connected to obtain access into the housing.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

Having thus described the invention what is claimed and desired to be secured by Letters Patent is:

1. A bait station or trap for rodents and comprising a housing structure incorporating side walls, two ends walls, a top wall, and a bottom wall, said housing having lower wall means for supporting it above the surface on which it rests thereby forming a housing tunnel enclosed by said lower wall means on three sides under said bottom wall and extending substantially the length of said housing, there being a substantially vertically arranged entrance into the formed housing tunnel proximate a first of said end walls, said bottom wall having an opening therein and defining an entrance chamber opening upwardly into the housing structure, said bottom wall opening being located proximate a second of said end walls opposite the location of the entrance into the housing tunnel the length of said housing tunnel being such as to provide a substantially darkened entrance for any rodent entering into the entrance chamber a bait chamber provided within the housing structure, a circuitous path between said entrance chamber and said bait chamber, at least one partition within the housing interior and within the circuitous path between the entrance chamber and the bait chamber, said partition having an opening therethrough so as to permit access of any rodent from said entrance chamber and to the bait chamber, and one of said end, side, and top walls being openable to attain access into the interior of the said housing structure.

2. The invention of claim 1 and wherein one of said side walls being openable, said side wall being hingedly connected to the said housing structure and capable of being pivoted open to attain access into the various chambers within the said bait station.

3. The invention of claim 2 and including fastening means for securement of said hingedly mounted side wall to the housing structure.

4. The invention of claim 1 and wherein said top wall of the housing structure being removable.

5. The invention of claim 1 and including fastening means securing said slidable top wall to the said housing structure.

6. The invention of claim 1 and including flanges integrally formed along the upper edges of said side walls and extending their length thereof, said top wall along its sides having turned edges, said turned edges of the top wall disposed for engagement with the flanges of the side walls, whereby said top wall can be slid into interlocking engagement with the housing structure during its closure.

* * * * *

UNITED STATES PATENT AND TRADEMARK OFFICE
CERTIFICATE OF CORRECTION

PATENT NO. : 4,625,452
DATED : December 2, 1986
INVENTOR(S) : Charles E. Knote

It is certified that error appears in the above—identified patent and that said Letters Patent is hereby corrected as shown below:

Claim 1, line 2, change "ends" to ---end---.

Claim 5, line 1, change "1" to ---6---.

Signed and Sealed this

Tenth Day of March, 1987

Attest:

DONALD J. QUIGG

*Attesting Officer*      *Commissioner of Patents and Trademarks*